J. G. PERRY.
Stove Pipe Elbow.
No. 43,130. Patented June 14, 1864.
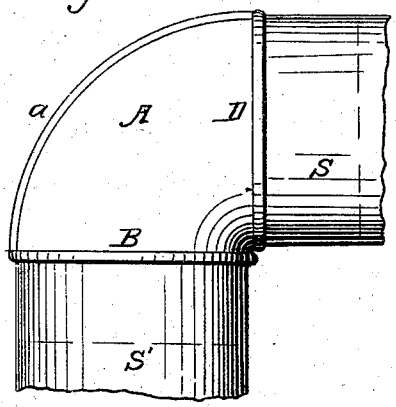
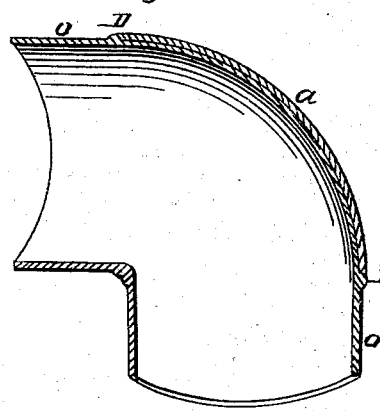
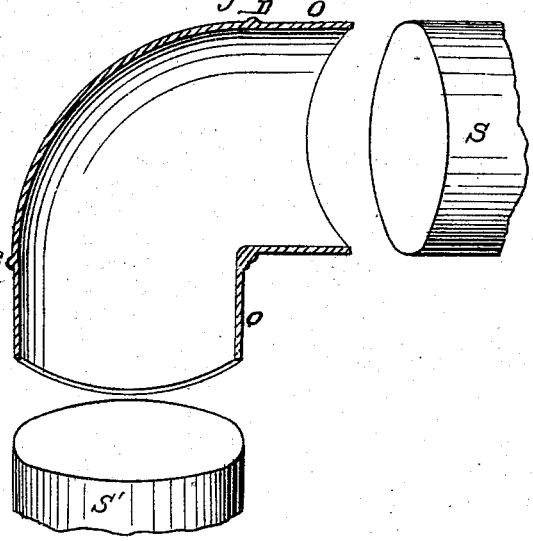
Witnesses:
Inventor:
John G. Perry

UNITED STATES PATENT OFFICE.

JOHN G. PERRY, OF SOUTH KINGSTON, RHODE ISLAND.

IMPROVEMENT IN STOVE-PIPE ELBOWS.

Specification forming part of Letters Patent No. 43,130, dated June 14, 1864.

*To all whom it may concern:*

Be it known that I, JOHN G. PERRY, of South Kingston, in the county of Washington, in the State of Rhode Island, have invented a new and useful Improvement in Making Elbows or Knees for Pipes for Stoves, Furnaces, &c.; and I do hereby declare that the following is a full and correct description thereof, reference being had to the accompanying drawings, forming part of this specification, and to the letters of reference marked thereon.

Similar letters on the different figures refer to the same parts.

Figure 1 is a perspective view of the elbow or knee. Figs. 2 and 3 represent the two parts of the same separated from each other.

My invention consists in making an elbow or knee of cast metal to take the place of the elbow or knee in common use in pipes for stoves, furnaces, &c., over which it has many advantages, as it can be made cheaper and will last many times as long. It will also benefit the draft by offering less obstruction to the passage of the smoke and gases, and at the same time it gives the pipe a more finished appearance. That any one may be able to understand its construction, I will describe it.

The elbow or knee is divided into two parts, as seen in Figs. 2 and 3. On the outside curve of one part a bead, a, is made, which forms a rabbet or recess for the other part to shut into to form a close joint. A bead is carried around at D B to strengthen the metal and offer a stop to the pipe when driven onto the ends, which are made tapering, so that the pipe may draw the parts close together and close the joints. The two parts may be riveted, if required, but I have not found it necessary, as the ends of the pipe that are driven onto the taper ends of the elbow are sufficient to hold them together. These parts of the elbow are easy, from their shape, to cast in iron, or bronze, or other metal.

The operation or use will be readily seen in the description of the construction. The two parts of the elbow being put together, the ends of the pipe S S are driven on tight.

I claim—

A cast-iron stove-pipe knee, constructed as herein described, as a new article of manufacture.

JOHN G. PERRY.

Witnesses:
 E R. POTTER,
 J. E. PERRY.